Patented Oct. 22, 1946

2,409,986

UNITED STATES PATENT OFFICE 2,409,986

COATING COMPOSITIONS FOR MOISTUREPROOFING BY HOT MELT COATING

Martin Salo, Rochester, N. Y., assignor to Eastman Kodak Company, Rochester, N. Y., a corporation of New Jersey No Drawing. Application March 18, 1944,
Serial No. 527,154

7 Claims. (Cl. 260—16)

This invention relates to a composition adapted to form moisture vaporproof coatings when applied in a molten condition to a surface, such as paper or cloth.

Compositions of various kinds have been suggested for use in imparting moisture vaporproof coatings to paper, cloth, or similar material. Some of these compositions give coatings which are soft or opaque or crease with breaking upon impact. In other cases, the moisture vaporproofing has been not as effective as desired. In most or all of the cases known, the composition for moisture vaporproofing has been applied by means of a solution thereof in a volatile solvent. This method involves the handling of organic solvents and solutions, and for economical operation, the collecting of the vapors thereof and recovery of the same.

One object of my invention is to provide a novel composition which is of value as a non-blocking melt-coating composition to make possible the coating of surfaces without the use of a volatile solvent. Another object of my invention is to provide a practicable melt-coating composition which gives moisture vaporproof coatings which are hard, firm and flexible, giving surfaces which are clean, transparent and brilliant in character. A further object of my invention is to provide a cellulose ester composition which can be used for melt-coating purposes at restricted temperatures, such as 150–200° C., but will be non-tacky at temperatures below 150° F. or 66° C. A still further object of my invention is to provide a moisture vaporproofing coating which will crease without breaking upon impact and will heatseal, forming a strong bond. Other objects of my invention will appear herein.

I have found that the following composition is eminently suited for melt-coating paper, cloth or other surfaces in molten condition which upon cooling and solidifying gives a high moisture vaporproofing thereto.

*Composition.*—At least 40% of a cellulose ester containing at least 42% butyryl and at least 50% total acyl, 10–40% of unmodified castor oil, ½–7 of wax, such as paraffin, and blending agent in sufficient amount to render the wax compatible with the plasticized cellulose ester and to impart permanence to this composition. In order to obtain the best film properties, it is desirable that the cellulose ester be present in the maximum proportion possible or, in other words, the smallest proportions of plasticizer and blending agent which will give good fluidity and compatibility are preferably employed.

The cellulose esters which I have found to be suitable for use in compositions in accordance with my invention are butyric acid esters of cellulose having a butyryl content of at least 46% and a total acyl content of at least 50% and which are either fully esterified or have been hydrolyzed so that the esters have no more than about two hydroxyl groups per 24 cellulose carbon atoms. The cellulose esters employed should have a fundamental cuprammonium viscosity of less than 10 centipoises and a viscosity within the range of 10–100 centipoises when 1 part of ester is dissolved in 9 parts (by weight) of acetone at a temperature of 25° C. The fundamental cuprammonium viscosity is determined by obtaining in centipoises the viscosity of a cuprammonium solution of the ester in which the cellulose of the ester is of 2½% concentration. The cellulose esters employed should be heat stable or, in other words, they should not darken or lose viscosity when moderately elevated temperatures, such as 150–200° C. are applied thereto.

The cellulose esters which are employed in preparing my compositions may be prepared by reacting cellulose with butyric anhydrides, preferably after a pretreatment using little or no acetic acid, the acetyl, if any, being present in such small proportion in the esterification mass that the prescribed proportion of butyryl is present in the resulting product. The cellulose may be pretreated by the method described in Gardner Patent No. 2,113,301 preferably using therewith the dehydration method described in Malm Patent No. 2,315,973, or by the pretreatments described and claimed in Malm Patents Nos. 2,342,415 and 2,342,416, providing, of course, the acetic acid contained is kept to a minimum. Esterification of the cellulose with butyric anhydride and catalyst, such as by the methods described and claimed in Blanchard Patent No. 2,304,792 or Malm Patents Nos. 2,362,576 and 2,345,406 results in a high butyryl cellulose ester, particularly if the proportion of butyryl to the total acyl is kept sufficiently high in the esterification mass. If hydrolysis is employed, it is preferable that it only be for a sufficient time to reduce the sulfur content of the ester, as the substantially fully esterified esters are the most desirable for use in melt-coating processes in acordance with my invention. It is desirable that the esters employed have a char point of at least 260° C. If a high butyryl ester is available which does not have this char point, it should be stabilized, such as by the method described and claimed in Malm and Kirton Patent No. 2,250,201 or by the method described and claimed in Malm and Crane Patents Nos. 2,346,498 and 2,341,455 to a point where the ester does exhibit a char point of at least 260° C.

The cellulose esters employed in my compositions may be either simple esters i. e. cellulose butyrates or mixed esters i. e. cellulose acetate butyrates, cellulose propionate butyrates, cellulose acetate propionate butyrates. A small part of the butyryl in the esters may be replaced by propionyl or by fatty acid groups of 5-8 carbon atoms or even fatty acid groups of more than 8 carbon atoms although with the latter, the proportion should be quite small to avoid softness and stretchiness.

The plasticizer which I have found to be suitable in moisture vaporproofing melt-coating compositions in accordance with my invention is castor oil of the unmodified type. Castor oil which has been modified by some blowing or oxidation or hydrogenation process is sufficiently altered in properties that it will not satisfactorily perform in a composition in accordance with my invention. Therefore, only unmodified castor oil, such as raw castor oil is suitable for use in my composition.

If desired, instead of using only unmodified castor oil alone as the plasticizer in my compositions, the plasticizer may be a mixture of unmodified castor oil and di-2-ethyl hexyl phthalate. The use of the latter as the plasticizer in compositions of this type is disclosed in my copending application Serial No. 527,153 filed of even date.

The plasticizer should be in a proportion of 10-40% of the composition. It is desirable that the least amount of plasticizer necessary to impart good fluidity to the composition be employed. With esters having a butyryl near to the tributyrate or a viscosity in the lower part of the viscosity range given, the amount of plasticizer need not be as great as with the higher viscosity cellulose esters or those with a butyryl content in the lower portion of the range given. If the plasticizer is employed in a greater proportion than that specified, the melt coating composition, upon applying to a surface, solidifies slowly and yields a soft non-rigid structure from which the wax has a tendency to crystallize out upon coating, giving a water vapor permeability higher than desired and also a poor appearance. A coating with a percentage of plasticizer above that specified also exhibits a tendency to be tacky at low temperatures such as below 150° F. If plasticizer were employed in my composition in a proportion below 10%, it would be necessary to obtain good fluidity to employ cellulose esters of a lower viscosity than specified. The use of such low viscosity esters would result in products of undesirable physical properties, such as brittleness. The above is offered as a guide as to the correct proportion of plasticizer to employ in a composition in accordance with my invention for the purpose to which the composition is to be adapted. Ordinarily the suitable proportion of castor oil will be within the 10-40% range.

I have found paraffin to be most satisfactory as a wax for use in compositions in accordance with my invention. However, other waxes may be employed although there is some variation in their effectiveness. Beeswax and carnauba wax give good values for moisture vaporproofing in accordance with my invention, as does also ceresin and Chinese wax. Waxes generally may be employed in compositions in accordance with my invention.

The wax should be present in a proportion of at least ½% in my compositions to resist the penetration of moisture and not more than 7%, as too great a proportion of wax tends to separate out and interfere with the brilliance and hardness of the coating therefrom.

I have found four materials which function as blending agents and assure permanence of my compositions. The blending agents are necessary to cause compatibility of the wax with the plasticized cellulose esters, and to avoid separating out of the wax after the composition has been applied as a melt-coating to a surface which is to be protected. It is desirable that the blending agent be employed in the minimum proportion necessary to impart compatibility and permanence to the composition in order to allow a high proportion of cellulose ester in the composition. The materials which have been found to be particularly suitable for use as blending agents are: unhydrolyzed polyvinyl acetates having a viscosity of 1½-10 cps.; Pentalyn A or EC which is the trade name of a pentaerythritol ester of rosin having a melting point of approximately 110° C. and an acid number of 19 maximum; Lewisol 2L which is a rosin-maleic acid-glycerol resin having a melting range of 130-140° C. and an acid number of 15 maximum; and Piccolyte S-85 which is polymerized $\beta$-pinene having a melting point of approximately 85° C. These materials are all well known commercial products which are obtainable at the present time. The Pentalyn-type resins and their method of preparation are described in U. S. Patent No. 1,820,265 of Bent and Johnson. The Piccolyte-type resins are described in U. S. Patent No. 2,320,717 of Corkery. The proportion of blending agent used in my composition should be sufficient to render the wax compatible with the other ingredients of the composition. This depends to some extent upon the proportion of wax which is being employed. For instance, with a composition in which 1% of wax is used, a proportion of Lewisol within the range of 5-32% will assure compatibility of the wax with the plasticized cellulose ester and permanence of the resulting composition. With the use of a larger proportion of wax, such as 5%, a larger proportion of blending agent is desirable and an amount of Lewisol within the range of 15-32% should be employed in order to obtain good compatibility. Also, with the other blending agents, a larger proportion thereof should be employed with an increased amount of wax. Using but a small proportion of wax, such as 1%, a proportion of Pentalyn A within the range of 5-25% will be satisfactory, whereas with polyvinyl acetate having a viscosity of 2.5 cps., a proportion within the range of 5-20% will be most useful. In the case of Piccolyte, an amount within the range of 2-5% is sufficient, it being desirable to employ no more than this amount in the composition. When polyvinyl acetate is employed as the blending agent, it is desirable to select the polyvinyl acetate according to viscosity to be most suitable for maximum operation. For instance, with cellulose esters in the higher part of the viscosity range specified, it is desirable to employ a polyvinyl acetate in the lower portion of the viscosity range given therefor. With, however, the lower viscosity cellulose esters, a higher viscosity polyvinyl acetate may be employed. The criterion as to the composition is that the melt of that composition will be sufficiently fluid for coating operations.

In preparing compositions in accordance with my invention, it is desirable that the wax, the blending agent and the plasticizer first be thoroughly mixed together at an elevated temperature, such as 160–180° C. After these materials have been melted together, the cellulose ester may be slowly introduced into the mixture with stirring. A smooth, homogeneous melt may be obtained thereby which is eminently suitable for melt-coating operations. It is desirable that the melt exhibit a viscosity between 10,000 and 50,000 centipoises for the best results in the melt-coating operation. Where the properties of the coating are important, it is desirable to have as large a proportion of cellulose ester in the composition as possible providing the fluidity, compatibility and moisture proofing properties of the composition are sufficient. The ultimate composition desired for this purpose will vary depending upon the characteristics regarded as most important by the individual operator.

If desired, after a homogeneous melt of the ingredients of my composition is obtained, the mixture may be led directly to the coating machine or it may be broken up into granules so that it may be stored and used when convenient. The granules may be melted when desired for coating in suitable heated mixing equipment or a heated piston or a worm gear extruder and fed into a melt-coating machine, particularly one which operates in a continuous manner. Various types of apparatus may be employed to coat the melt-coating composition onto the surface of a material to support the vaporproof coating. The coating may be applied onto its support by any one of four different coating methods, namely: the knife, the roll, the casting and extrusion methods. The roll-coating method involving a pick up and applicator roll seems most practical at the present time. The roll-coating type of machine can be adapted to a squeeze or calender method of coating by passing the cloth or paper between the two coating rolls, rotating in the direction of the material. With this method, it is possible to coat both sides simultaneously if the melt is provided for both the top and bottom of the paper. After coating, the material may then pass through a smoothing apparatus such as depends upon the use of a heated bar of suitable design. Upon cooling, the material will be found to have a surface of good clarity and color. The various methods of applying hot melt compositions are shown in the art and need not be repeated here. For the coating of articles which cannot be put through such apparatus, such articles as electrical equipment, tools, packaged merchandise and the like, a coating may be applied thereto by dipping the article in the composition in a molten condition.

The following examples illustrate my invention:

Example 1

A melt-coating composition was made by mixing 46 grams of a cellulose acetate butyrate, which analyzed for 46.3% butyryl and 6.8% acetyl, at 160–180° C., with a mixture of 24 grams of Lewisol 2L, 30 grams of castor oil (unmodified) and 1 gram of paraffin. This was coated onto a lightweight paper and gave a flexible, brilliant, water-vaporproof paper.

Example 2

A melt-coating composition was made by mixing 53.4 grams of a cellulose acetate butyrate, which analyzed for 52% butyryl and 1.4% acetyl, at 160–180° C., with a mixture of 10 grams of Lewisol 2L, 35.6 grams of castor oil (unmodified) and 1 gram of paraffin. This was coated onto a lightweight paper and gave a flexible, brilliant, water-vaporproof paper.

Coatings of compositions in accordance with my invention have been found to give moisture vapor permeabilities at 104° F. and 80% relative humidity of 0.2 to .04 mg. per square centimeter per hour in coatings of a thickness of .0005 to .001 inch on glassine paper, thus comparing with the best moisture vaporproof coatings coated out from solvents.

Some typical compositions which are very suitable for melt-coating using cellulose acetate butyrate having a butyryl content of 50% and a viscosity in 10% solution in acetone of 100 centipoises, polyvinyl acetate having a viscosity of 2.5 centipoises as the blending agent and 1% of paraffin wax are as follows:

| Cellulose ester | Castor oil | Polyvinyl acetate |
|---|---|---|
| Per cent | Per cent | Per cent |
| 66 | 19 | 14 |
| 64 | 23 | 12 |
| 68 | 13 | 18 |
| 70 | 19 | 10 |

Some examples of compositions in accordance with my invention using 5% of paraffin and Lewisol 2L as the blending agent are as follows:

| Cellulose ester | Castor oil | Lewisol |
|---|---|---|
| Per cent | Per cent | Per cent |
| 54 | 22 | 19 |
| 52 | 18 | 25 |
| 48 | 22 | 25 |
| 48 | 28 | 19 |

Using 1% of paraffin and Lewisol 2L as the blending agent, some compositions which may be employed as are follows:

| Cellulose ester | Castor oil | Lewisol |
|---|---|---|
| Per cent | Per cent | Per cent |
| 58 | 31 | 10 |
| 52 | 27 | 20 |
| 48 | 21 | 30 |
| 54 | 35 | 10 |

Some typical compositions using Pentalyn as the blending agent and 1% of paraffin are as follows:

| Cellulose ester | Castor oil | Pentalyn |
|---|---|---|
| Per cent | Per cent | Per cent |
| 68 | 21 | 10 |
| 58 | 17 | 24 |
| 64 | 19 | 16 |
| 60 | 27 | 12 |

Ordinarily, compositions in accordance with my invention give the most desirable coatings if the coatings are set quickly, such as by rapidly leading the coated material from the coating point to a region of lower temperature. However, I have found that even in cases where the setting takes place slowly or some opaqueness is present that the low watervapor permeability of the coating is still present.

My compositions are particularly adapted for coating sheet materials, such as cloth, paper, glassine, sheet metals or foils or the like. If desired, however, articles may be dipped in the composition in molten condition to give a moisture vaporproof coating thereon. It is preferred in the majority of cases that the paper or other material being coated be of at least moderate strength so as to avoid any danger of breakage in the coating operation. Paper or cloth coated as described herein may be employed for wrapping materials in which either loss of moisture from the contents of the package or the taking on of moisture is to be prevented. My invention is only limited by the scope of the appended claims.

The viscosities of the polyvinyl acetates as referred to herein are those of a solution in benzene of 86 grams of polyvinyl acetate per 1000 cc. of solution at 20° C.

I claim:

1. A non-blocking melt coating composition adapted to give coatings of low moisture vapor permeability, essentially consisting of at least 40% of a heat stable butyric acid ester of cellulose having a butyryl content of at least 46% and a total acyl content of at least 50%, a cuprammonium viscosity of less than 10 centipoises, a viscosity in 10% acetone solution at 25° C. of 10 to 200 centipoises, and not more than two hydroxyl groups per 24 cellulose carbon atoms, sufficient unmodified castor oil within the range of 10-40% to give a composition of good fluidity at 150-200° C., ½-7% of wax and sufficient of a rosin-maleic acid-glycerol resin having a melting point within the range of 130-140° C. and an acid number of 15 maximum to render the wax permanently compatible with the composition.

2. A non-blocking melt coating composition adapted to give coatings of low moisture vapor permeability, essentially consisting of approximately 55 parts of a heat stable cellulose acetate butyrate having a butyryl content of approximately 50%, a cuprammonium viscosity of less than 10 centipoises, a viscosity in 10% acetone solution at 25° C. of 10 to 200 centipoises, and not more than 2 hydroxyl groups per 24 cellulose carbon atoms, approximately 35 parts of unmodified castor oil, approximately one part of paraffin, and approximately 10 parts of a rosin-maleic acid-glycerol resin, having a melting point within the range of 130-140° C. and an acid number of 15.

3. A non-blocking melt coating composition adapted to give coatings of low moisture vapor permeability, essentially consisting of approximately 55 parts of a heat stable cellulose acetate butyrate having a butyryl content of approximately 50%, a cuprammonium viscosity of less than 10 centipoises, a viscosity in 10% acetone solution at 25° C of 10 to 200 centipoises, and not more than 2 hydroxyl groups per 24 cellulose carbon atoms, approximately 35 parts of unmodified castor oil, approximately one part of beeswax, and approximately 10 parts of a rosin-maleic acid-glycerol resin, having a melting point within the range of 130-140° C. and an acid number of 15.

4. A non-blocking melt coating composition adapted to give coatings of low moisture vapor permeability, essentially consisting of approximately 55 parts of a heat stable cellulose acetate butyrate having a butyryl content of approximately 50%, a cuprammonium viscosity of less than 10 centipoises, a viscosity in 10% acetone solution at 25° C. of 10 to 200 centipoises, and not more than 2 hydroxyl groups per 24 cellulose carbon atoms, approximately 35 parts of unmodified castor oil, approximately one part of carnauba wax, and approximately 10 parts of a rosin-maleic acid-glycerol resin, having a melting point within the range of 130-140° C. and an acid number of 15.

5. A non-blocking melt-coating composition adapted to give coatings of low moisture vapor permeability, essentially consisting of at least 40% of a heat-stable butyric acid ester of cellulose having a butyryl content of at least 46% and a total of acyl content of at least 50%, a cuprammonium viscosity of less than 10 centipoises, a viscosity in 10% acetone solution of 25° C. of 10-200 centipoises and not more than 2 hydroxyl groups per 24 cellulose carbon atoms, sufficient unmodified castor oil within the range of 10-40% to impart good fluidity to the composition at 150-200° C., ½-7% of wax, and sufficient of a blending agent to render the wax permanently compatible with the composition, said blending agent being selected from the group consisting of the pentaerythritol esters of rosin having a melting point of approximately 110° C., and acid numbers of 19 maximum, and the rosin-maleic acid-glycerol resins having a melting range of 130-140° C. and acid numbers of 15 maximum.

6. A non-blocking melt-coating composition adapted to give coatings of low moisture vapor permeability, essentially consisting of at least 40% of a heat-stable butyric acid ester of cellulose having a butyryl content of at least 46% and a total acyl content of at least 50%, a cuprammonium viscosity of less than 10 centipoises, a viscosity in 10% acetone solution of 25% C. of 10-200 centipoises and not more than 2 hydroxyl groups per 24 cellulose carbon atoms, sufficient unmodified castor oil within the range of 10-40% to impart good fluidity to the composition at 150-200° C., ½-7% of paraffin wax, and sufficient of a blending agent to render the paraffin wax permanently compatible with the composition, said blending agent being selected from the group consisting of the pentaerythritol esters of rosin having a melting point of approximately 110° C., and acid numbers of 19 maximum, and the rosin-maleic acid-glycerol resins having a melting range of 130-140° C. and acid numbers of 15 maximum.

7. A non-blocking melt-coating composition adapted to give coatings of low moisture vapor permeability, essentially consisting of at least 40% of a heat-stable butyric acid ester of cellulose having a butyryl content of at least 46% and a total acyl content of at least 50%, a cuprammonium viscosity of less than 10 centipoises, a viscosity in 10% acetone solution at 25° C. of 10 to 200 centipoises, and not more than two hydroxyl groups per 24 cellulose carbon atoms, sufficient unmodified castor oil within the range of 10-40% to give a composition of good fluidity at 150-200° C., ½-7% of wax, and sufficient of a pentaerythritol ester of rosin having a melting point of approximately 110° C. and an acid number of 19 maximum to render the wax permanently compatible with the composition.

MARTIN SALO.